March 3, 1942. R. B. BOOTH 2,274,658
DEGASIFICATION AND CLARIFICATION OF LIQUID DISPERSIONS
Filed Oct. 13, 1939
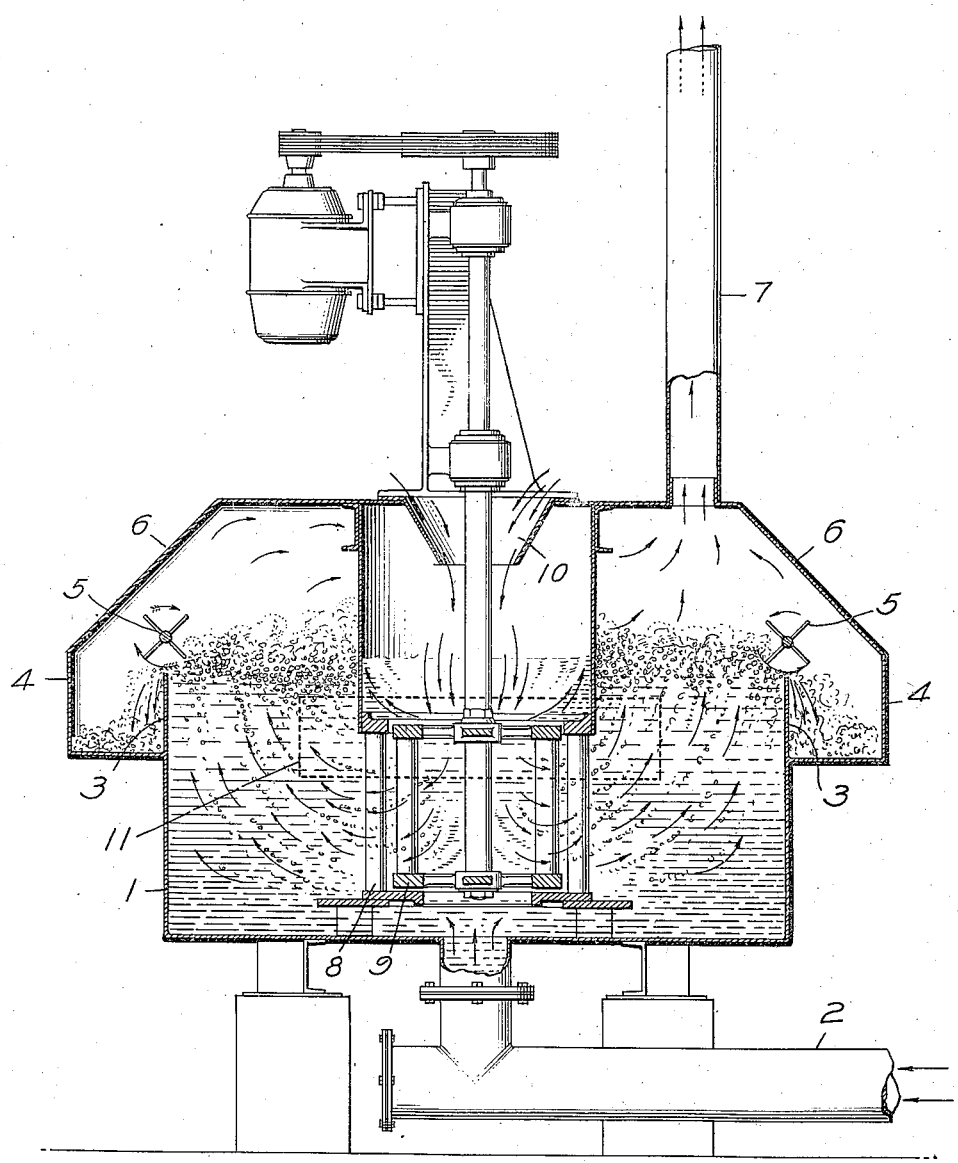
INVENTOR.
ROBERT B. BOOTH,
BY Robert Ames Norton
ATTORNEY Patented Mar. 3, 1942

2,274,658

UNITED STATES PATENT OFFICE 2,274,658

DEGASIFICATION AND CLARIFICATION OF LIQUID DISPERSIONS

Robert Ben Booth, Springdale, Conn., assignor, by mesne assignments, to Manville Jenckes Corporation, Manville, R. I., a corporation of Delaware Application October 13, 1939, Serial No. 299,319

8 Claims. (Cl. 210—53)

This invention relates to a process for the simultaneous concentration by flotation of solid materials from liquid suspensions thereof and the removal of obnoxious gases and/or volatile liquids entrapped or dissolved in the suspension.

In various industrial processes, it is often desired to continuously free large quantities of liquid suspensions or emulsified materials from solid substances such as impurities, precipitates, ore materials, and the like, and also remove or recover certain volatile constituents for example entrapped or dissolved obnoxious gases. The usual industrial filtration or clarification processes are frequently not economical and do not remove the obnoxious gases or volatile liquids. Moreover, when the suspensions contain obnoxious gases and the suspended materials are very finely dispersed, for example, colloidal, the industrial difficulties in separation are still greater because the colloidal substances can only be filtered imperfectly or very slowly so that with large quantities of liquid the output of the filtration apparatus is greatly reduced and while some of the obnoxious, poisonous or corrosive gases which are present may be removed, they remain to a very large extent to produce their harmful effects.

If it is attempted to clarify liquids of this nature by allowing them to settle, excessively large settling tanks and very long periods of time are required, and when obnoxious gases are present, a difficult ventilation problem is encountered, furthermore, the presence of gases may also cause deterioration or undesirable changes in the solid materials of the solution. One of the more serious problems of this sort in industrial processes has been in connection with the treatment of cellulose regeneration baths containing finely divided suspended solids and hydrogen sulfide gas.

According to the present invention liquid suspensions of finely divided floatable solid substances containing dissolved obnoxious gases are subjected to a froth flotation of at least one solid constituent combined with means for continuously removing from the flotation operation gases or vapors set free. I have found that a froth flotation not only separates floatable solid constituents in the form of a concentrate but also performs the additional function of setting free in gaseous form a large proportion of dissolved gas or volatile constituents of the suspension. When the froth flotation operation is effected under conditions which provide for continuous removal of these gases or vapors as they are evolved, the operation performs both functions and neither function is decreased in efficiency by the performance of the other. This is an unusual result in connection with most physical and chemical processes because usually a process capable of performing more than one function represents a compromise between the best conditions for one function and the best conditions for the other. It is an outstanding advantage of the present invention that no such compromise is necessary. The flotation operation can be carried out under conditions of maximum flotation efficiency without in any way detracting from the process as a degasifying procedure. Both flotation and degasification can therefore be effected at maximum efficiency by the same operation.

It is a further advantage of the present invention that the equipment used in flotation can be modified to perform the dual function of the present invention at small expense. Excellent degassing results can be obtained by simply providing suitable closed equipment from which the evolved gases can be drawn off by ordinary ventilating procedures. If it is desirable to remove at even greater efficiency, a vacuum can be employed and it is a further advantage of the present invention that when the vacuum is employed the flotation operation is not rendered less efficient but in fact the vacuum actually decreases the amount of power and air required for the flotation per se because of the evolution of gases or vapors in the material treated would replace the corresponding amount of air that would otherwise be necessary.

The drawing which is a vertical sectional view illustrates a suitable Fagergren flotation apparatus for carrying out the present invention. The apparatus comprises a tank 1 having inlet 2 in the bottom suitable for introducing liquids and an overflow weir 3 leading to a launder 4. The tank 1 is covered by a hood 6 which has an opening into a vent pipe 7. An agitating and aerating mechanism which is comprised of a stator 8 having located therein a rotor 9, said stator and rotor mechanism being so arranged that when the rotor is rotated liquid pulps contained in the tank 1 are agitated and air is drawn into the liquid through the passageway 10. A pair of skimmers 5 are positioned above the tank in such a manner that when rotated they will carry the froth containing solids over the weir 3 into the launder 4. The tank is also provided with an outlet 11 through which the liquid is passed from the tank after the solids and gases have been removed therefrom.

In utilizing the apparatus illustrated in carrying out the present invention the cellulose regenerating bath containing hydrogen sulfide and solid colloidal materials is introduced into the flotation apparatus through the inlet 2, whereupon the liquid is subjected to agitation and aeration by the rotating action of the rotor mechanism being driven from a suitable source of power indicated here as an electric motor. The air displaces the hydrogen sulfide from the liquid which collects in the hooded portion above the tank and is withdrawn through the vent 7. The volatile constituent and/or gaseous constituents may be either collected from the vent pipe or passed to waste. The solid constituents are collected in the froth at the top of the tank and carried by means of a skimmer into the launder 4 and thence to any suitable collecting or storage tank. The liquid free from hydrogen sulfide and also free from solid colloidal materials is passed from the flotation tank by means of the outlet 11 and is ready for re-use in the regeneration of hydrated cellulose.

The present invention is, of course, not limited to the use of the particular type of apparatus disclosed, and the process may be carried out by other types of apparatus which have suitable agitating and aerating mechanisms combined with means for collecting the hydrogen sulfide and other contaminating gases when displaced from the liquid by the air, and suitable means for collecting the solids in the froth, and also means for removing the clarified and degassed liquid from the tank.

In the spinning of rayon the cellulose xanthate viscose is extruded through fine openings in so-called spinnerets into a bath which regenerates hydrated cellulose to form a filament which may then be spun with others to form rayon yarn. These baths contain salts and acids for decomposing the strongly alkaline cellulose xanthate. Typical baths contain from 8–10% of sulfuric acid, glucose and various salts such as sodium sulfate, sodium sulfite and the like. During spinning, the alkali in the viscose reacts to form sodium sulfate and the decomposition of the xanthic acid radical results in setting free a considerable amount of sulfur, which is present in a very finely divided and sometimes colloidal form, and also hydrogen sulfide or other obnoxious gases. Such gases are often gradually liberated during the circulation of the liquid, suspension, etc., and present a serious ventilation problem. The same sort of problems are encountered when hydrated cellulose is produced in sheet form as for example Cellophane.

Various methods for the clarification of the cellulose regeneration baths have heretofore been proposed and some are in fairly extensive use. Most of the methods have depended on filtration using, for example, excelsior, wood shavings, burlap, coarse woolen cloth and the like. A certain degree of clarification is achieved by these filters but they are only used where a high degree of clarity of bath is not required. In recent years some operators have required a bath of a higher degree of clarity and have installed sand filters which operate continuously. These filters, however, require periodic backwashing with water and considerable losses of bath occur. While it is possible to effect clarification by such filtering processes, they are expensive and the highest clarity is only obtained with special filters requiring very careful supervision and even with the best filters clarity is not as high as could be desired. Not only are the filtering processes cumbersome and expensive but they also do not remove the obnoxious gases which are present, for example, hydrogen sulfide.

The disadvantages of the above-described methods for the clarification of foul cellulose regenerating baths were very largely overcome by the method as described in my U. S. Patent No. 2,153,449. However, there was no provision made for removing the obnoxious hydrogen sulfide gas.

A method is described in my copending application Serial No. 299,320 for removing hydrogen sulfide and/or other contaminating gases from fouled, cellulose regenerating baths using a mechanical flotation machine in such a manner that the solids are not removed. A second method of removing hydrogen sulfide and/or other gases from fouled, cellulose regenerating baths without removing the solid constituents is described in my copending application Serial No. 299,321 in which a partial vacuum is employed.

In the preferred embodiment of the present invention cellulose regenerating baths are clarified by a froth flotation process such as is described in the aforementioned patent at the same time removing the obnoxious hydrogen sulfide gas and in certain cases to some extent decolorizing the solution. By the use of flotation machines or processes the greater portion of the hydrogen sulfide gas is liberated and confined to a limited space where means are provided for collecting and passing the poisonous hydrogen sulfide into the atmosphere as waste. This factor is especially important in rayon manufacturing in which the expense of ventilation due to the presence of the hydrogen sulfide gas frequently represents a large part of the processing cost.

It is therefore an advantage of the preferred embodiment of the present invention that the sulfur and other impurities can be floated off from the bath with a very slight loss of bath and with the production of an extraordinarily clear and decolorized bath for reuse and at the same time disposal of the hydrogen sulfide or other obnoxious gases is provided for. The flotation and degasification process may be carried out either with or without a collecting agent.

The present invention is not limited to any particular type of flotation machine. Excellent results are obtained with highly efficient machines of the mechanical type such as a Fagergren machine. However, the preferred embodiment of the present invention represents a peculiar situation because simple pneumatic machines can be used without serious loss in flotation efficiency. This is not the case with most flotation processes where the highly developed mechanical machines with their superior agitation and aerating efficiency have relegated the pneumatic machines to a relatively minor position in the art.

While the preferred embodiment of the present invention is in connection with the clarification and degasification of cellulose regeneration baths it is also useful in the treatment of various other suspensions containing obnoxious gases and/or volatile liquids. The invention will be described in greater detail in conjunction with the following specific examples which set forth the clarification, decolorization and degasification of a typical rayon bath. It should be understood that the invention is not limited to the particular details set forth in the examples.

Example 1

A sample of rayon bath fouled by impurities produced in the rayon spinning operation including sulfur and rayon fibers and containing 7.0–9.0 parts per million hydrogen sulfide was treated for five minutes in a Fagergren flotation machine provided with an attached ventilating duct. 91–95% of the solid impurities were skimmed from the froth at the surface of the bath. After the five minute treatment the bath contained only 2.5–5.0 parts per million hydrogen sulfide and the gases withdrawn from the bath were conducted away from the proximity of the flotation machine by means of the ventilating duct attached to the flotation machine.

Example 2

A sample of rayon spin bath fouled by impurities from the rayon spinning operation, including sulfur, was treated in a Fagergren flotation machine having an attached ventilating duct. In addition to the insoluble impurities present in the bath, the liquid also contained soluble impurities which imparted a yellow color to the bath. Furthermore, the hydrogen sulfide content of the bath at the start of the flotation operation was about 13.0–15.0 parts per million. After a thirty-second treatment in the flotation machine the bath contained only 5.0–6.0 parts per million hydrogen sulfide. In a three minute treatment 93–96% of the sulfur was removed and the bath then approached water-whiteness in color.

To demonstrate further the decolorizing action of the flotation treatment, samples of the fouled bath were passed through filters. Filtration removes the solid impurities from the bath but the yellow color still remained after the filtration operation, indicating that soluble impurities still remained in the liquid. Samples of this filtered material were subjected to a four-minute treatment in a Fagergren flotation machine. This treatment removed a substantial part of the yellow color from the bath which then approached water-whiteness in color.

Example 3

A sample of rayon spin bath containing impurities including sulfur and rayon fibers and containing about 14.0 parts per million hydrogen sulfide was treated for three minutes in a pneumatic type flotation cell provided with an exhaust fan arrangement for collecting the liberated gases. After the three-minute treatment the bath contained 3.5 parts per million hydrogen sulfide. 80–85% of the solid impurities was removed by flotation.

Example 4

Portions of the same fouled spin bath described in Example 3 were treated in a Fagergren flotation machine provided with an attached ventilating duct for three minutes in the presence of 0.03 lb./ton pine oil. About 87–92% of the solid impurities was removed in the froth at the surface of the bath. The bath after this treatment contained 5.4 parts per million hydrogen sulfide.

Other portions of this fouled spin bath were treated in a pneumatic type flotation cell operating with compressed nitrogen. The flotation cell was provided with an exhaust fan arrangement for collecting the liberated gases. A froth was formed and about 85% of the solid impurities was removed by skimming off this froth from the cell. The bath clarified by this treatment contained 1.5 parts per million hydrogen sulfide.

Example 5

A fouled rayon spin bath containing impurities produced in the rayon spinning operation including sulfur and 18.7 parts per million hydrogen sulfide was treated for three minutes in a pneumatic type flotation cell provided with ventilating means for removing the liberated gases and operating with compressed nitrogen. A froth was formed and about 85% of the solid impurities was removed by skimming off this froth from the cell. The bath clarified by this treatment contained 1.5 parts per million hydrogen sulfide.

Example 6

A sample of rayon spin bath containing impurities produced in the rayon spinning operation including sulfur was treated for three minutes in a flotation machine so arranged that air was introduced into the liquid and then removed by means of a partial vacuum applied above the surface of the bath. This vacuum also served as a means for the continuous removal of the froth bearing the insoluble impurities. About 90% of the sulfur was removed from the bath in the three-minute treatment. The clarified bath contained 3.5 parts per million hydrogen sulfide as compared to 14.0 parts per million at the start of the operation.

Example 7

A liquor containing about 0.28 g. of finely divided sulfur per liter and about 19 parts per million carbon bisulfide was treated for four minutes in a Fagergren flotation machine provided with an attached ventilating duct. From the froth produced at the surface of this liquid about 91% of the sulfur was skimmed. The liquor at the end of this four-minute treatment contained 1 part per million carbon bisulfide.

It is obvious that while the examples illustrate the operativeness of this invention as applied to rayon spin baths, this invention is not limited to this use only. It is apparent that any bath, liquid, chemical solution, suspension, sludge or the like may be treated by means of a flotation machine or subjected to a vacuum to remove gases, volatile liquids and the like, while being simultaneously clarified of solid matter.

The degassing action of the flotation machine is caused by, among other factors, the introduction of air into the liquids, suspensions, etc. and agitation of this air with the contents of the flotation cell. Thus, the flotation machine may be used in aerating processes or for the introduction of atmospheric oxygen into various materials for various purposes and may be used as an aerating device or means of conditioning or preparing liquids, suspension, etc. for other uses subsequent to the treatment in the flotation machine. Likewise, other gases, inert or chemically reactive, may be introduced into the flotation machine and, in turn, agitated with the contents of the flotation machine. The use of this type of apparatus for conducting chemical reactions is immediately apparent and by this application it may be possible to simultaneously introduce chemical reactants into a liquid medium, to allow the reaction to take place, to remove by flotation certain of the products, and to remove certain gaseous products from the system. It will be understood that the gaseous products, if valuable, may be recovered by common methods. Likewise the products removed by flotation may be valuable or may be materials tending to foul the liquid medium.

The present invention, while particularly useful for the removal of solid materials and trapped or dissolved gases from textile baths such as viscose rayon spin baths and other cellulose setting baths, is not limited thereto and can broadly be applied to any solution or suspension containing solid material and an obnoxious gas.

The process may be applied over a wide range of temperature. For example, it may be desirous to maintain the liquid or suspensions under treatment at low temperatures to retain certain constituents, more volatile at higher temperatures, during the removal of other materials. On the other hand, it may be desirous to aid the removal of obnoxious gases and the flotation of solid impurities by conducting the process at higher temperatures or at temperatures more or less set by the nature of the purpose for which the liquid, suspension, etc. is to be used. For example, in the processing of rayon the spinning operation is frequently conducted at temperatures in the neighborhood of 45° C. and thus this invention may be conveniently applied to the spin baths at these temperatures.

The term "obnoxious gas" as used in this specification and the claims annexed hereto refers to any gas entrained, trapped or dissolved in the liquid which is poisonous, corrosive, or which tends to foul the liquid, oxidize or alter the character of the suspended solid material or interfere with the useful function of the liquid bath.

The present process is also a very efficient method of decolorizing liquids such as spin baths containing soluble coloring material when such coloring matter can be destroyed or altered by aeration or oxidation methods.

What I claim is:

1. A method of concentrating solid materials and simultaneously removing obnoxious components in the form of a gas from a liquid suspension thereof which comprises subjecting the suspension to a froth flotation, removing a concentrate rich in at least one solid material and evolving and collecting substantially all of at least one obnoxious gas as liberated from the surface of the liquid.

2. A method of concentrating solid materials and simultaneously removing obnoxious components in the gaseous form from a liquid suspension thereof which comprises subjecting the suspension to a froth flotation removing a concentrate rich in at least one solid material and introducing a non-obnoxious gas displacing at least one obnoxious gas and collecting substantially all of said obnoxious gas as it is liberated from the surface of the liquid.

3. A method of concentrating solid materials and simultaneously removing obnoxious components in the gaseous form from a liquid suspension thereof which comprises subjecting the suspension to a froth flotation removing a concentrate rich in at least one solid material and introducing air displacing at least one obnoxious gas and collecting substantially all of said obnoxious gas as it is liberated from the surface of the liquid.

4. A method of concentrating solid materials and simultaneously removing obnoxious components in the gaseous form from a liquid suspension thereof which comprises subjecting the suspension to a froth flotation removing a concentrate rich in at least one solid material and collecting substantially all of at least one obnoxious gas as it is liberated from the surface of the liquid by means of a partial vacuum.

5. A method of clarifying and simultaneously removing the hydrogen sulfide from fouled regenerating baths from the regeneration of hydrated cellulose from viscose which bath contains sulfur deposited out of solution and hydrogen sulfide in solution which comprises subjecting the bath to froth flotation and removing the froth which contains the bulk of the turbid impurities and collecting substantially all of the hydrogen sulfide as it is liberated from the surface of the liquid.

6. A method of clarifying and simultaneously removing the hydrogen sulfide from fouled regenerating baths from the regeneration of hydrated cellulose from viscose which bath contains sulfur deposited out of solution and hydrogen sulfide in solution which comprises subjecting the bath to a froth flotation and at the same time introducing a non-obnoxious gas to displace the hydrogen sulfide, collecting substantially all of the hydrogen sulfide as it is liberated from the surface of the liquid.

7. A method of clarifying and simultaneously removing the hydrogen sulfide from fouled regenerating baths from the regeneration of hydrated cellulose from viscose which bath contains sulfur deposited out of solution and hydrogen sulfide in solution which comprises subjecting the bath to a froth flotation and at the same time introducing air to displace the hydrogen sulfide, collecting substantially all of the hydrogen sulfide as it is liberated from the surface of the liquid.

8. A method of clarifying and simultaneously removing the hydrogen sulfide from fouled regenerating baths from the regeneration of hydrated cellulose from viscose which bath contains sulfur deposited out of solution and hydrogen sulfide in solution which comprises subjecting the path to a froth flotation, and removing the froth which contains the bulk of the turbid impurities and collecting substantially all of the hydrogen sulfide as it is liberated from the surface of the liquid by means of a partial vacuum.

ROBERT BEN BOOTH.

CERTIFICATE OF CORRECTION.

Patent No. 2,274,658.                                              March 3, 1942.

ROBERT BEN BOOTH.

It is hereby certified that error appears in the printed specification of the above numbered patent requiring correction as follows: Page 4, second column, lines 38 and 49, claims 6 and 7 respectively, after "liquid" insert --and removing the froth which contains the bulk of the turbid impurities--; and that the said Letters Patent should be read with this correction therein that the same may conform to the record of the case in the Patent Office.

Signed and sealed this 21st day of April, A. D. 1942.

(Seal)

Henry Van Arsdale,
Acting Commissioner of Patents.